(12) United States Patent
Ting et al.

(10) Patent No.: US 7,660,880 B2
(45) Date of Patent: Feb. 9, 2010

(54) SYSTEM AND METHOD FOR AUTOMATED LOGIN

(75) Inventors: David M. T. Ting, Sudbury, MA (US); Chen Ho, Lexington, MA (US); Parind Shah, Woburn, MA (US); Bushan Yadav Byragani, Westford, MA (US)

(73) Assignee: Imprivata, Inc., Lexington, MA (US)

( * ) Notice: Subject to any disclaimer, the term of this patent is extended or adjusted under 35 U.S.C. 154(b) by 1577 days.

(21) Appl. No.: 10/395,043

(22) Filed: Mar. 21, 2003

(65) Prior Publication Data

US 2004/0205176 A1  Oct. 14, 2004

(51) Int. Cl.
*G06F 15/173* (2006.01)
(52) U.S. Cl. .............................. 709/223; 709/225; 726/8
(58) Field of Classification Search ................. 713/201, 713/202, 185; 705/51, 14; 707/9; 709/229, 709/250, 219, 223; 711/163; 726/4–10
See application file for complete search history.

(56) References Cited

U.S. PATENT DOCUMENTS

| 5,263,165 A * | 11/1993 | Janis .......................... 711/163 |
| 5,721,906 A | 2/1998 | Siefert ......................... 395/609 |
| 5,721,914 A | 2/1998 | DeVries ....................... 395/615 |
| 5,724,575 A | 3/1998 | Hoover et al. ................. 395/610 |
| 5,761,662 A | 6/1998 | Dasan .......................... 707/10 |
| 5,768,577 A | 6/1998 | Kleewein et al. ............. 395/610 |
| 5,841,888 A | 11/1998 | Setlak et al. ................. 382/124 |
| 5,857,028 A | 1/1999 | Frieling ....................... 382/116 |
| 5,857,188 A | 1/1999 | Douglas ......................... 707/9 |
| 5,892,838 A | 4/1999 | Brady ......................... 382/115 |
| 5,930,804 A | 7/1999 | Yu et al. ..................... 707/104 |
| 5,937,405 A | 8/1999 | Campbell ..................... 707/10 |
| 5,963,945 A | 10/1999 | Pal ............................. 707/10 |
| 5,966,705 A | 10/1999 | Koneru et al. .................. 707/9 |
| 5,977,964 A | 11/1999 | Williams et al. ............. 345/327 |
| 5,982,913 A | 11/1999 | Brumbley et al. ........... 382/124 |
| 5,982,914 A | 11/1999 | Lee et al. .................... 382/124 |
| 5,999,637 A | 12/1999 | Toyoda et al. ............... 382/124 |
| 6,016,476 A | 1/2000 | Maes et al. ..................... 705/1 |

(Continued)

FOREIGN PATENT DOCUMENTS

WO    98/16906    4/1998

(Continued)

OTHER PUBLICATIONS

International Search Report PCT/US 02/15469 dated Mar. 3, 2004.

(Continued)

*Primary Examiner*—William C. Vaughn, Jr.
*Assistant Examiner*—Greg Bengzon
(74) *Attorney, Agent, or Firm*—Goodwin Procter LLP

(57) ABSTRACT

User access to applications is controlled by associating an alias for an individual with a user profile for the individual; the user profile typically contains data referring to one or more applications. Access to an application is obtained using the data in the user profile, e.g., through automatic completion of forms or screens within an application. In addition, the user profile may be employed to limit user access to parts of an application, or to terminate a user's access to an application.

22 Claims, 4 Drawing Sheets

U.S. PATENT DOCUMENTS

| | | | | |
|---|---|---|---|---|
| 6,018,739 | A | 1/2000 | McCoy et al. | 707/102 |
| 6,021,211 | A | 2/2000 | Setlak et al. | 382/124 |
| 6,023,723 | A | 2/2000 | McCormick et al. | 709/206 |
| 6,041,411 | A | 3/2000 | Wyatt | 713/200 |
| 6,047,281 | A | 4/2000 | Wilson et al. | 707/3 |
| 6,047,282 | A | 4/2000 | Wilson et al. | 707/3 |
| 6,052,730 | A | 4/2000 | Felciano et al. | 709/225 |
| 6,061,790 | A | 5/2000 | Bodnar | 713/171 |
| 6,070,159 | A | 5/2000 | Wilson et al. | 707/3 |
| 6,076,167 | A | 6/2000 | Borza | 713/201 |
| 6,144,962 | A | 11/2000 | Weinberg et al. | 707/10 |
| 6,148,307 | A | 11/2000 | Burdick et al. | 707/104 |
| 6,151,602 | A | 11/2000 | Hejlsberg et al. | 707/10 |
| 6,178,511 | B1* | 1/2001 | Cohen et al. | 726/6 |
| 6,181,807 | B1 | 1/2001 | Setlak et al. | 382/124 |
| 6,182,076 | B1 | 1/2001 | Yu et al. | 707/10 |
| 6,195,954 | B1 | 3/2001 | Maeda | 707/3 |
| 6,212,290 | B1 | 4/2001 | Gagne et al. | 382/125 |
| 6,237,006 | B1 | 5/2001 | Weinberg et al. | 707/103 |
| 6,256,737 | B1* | 7/2001 | Bianco et al. | 713/186 |
| 6,289,111 | B1 | 9/2001 | Takhar | 382/115 |
| 6,292,795 | B1 | 9/2001 | Peters et al. | 707/3 |
| 6,301,376 | B1 | 10/2001 | Draganoff | 382/124 |
| 6,334,124 | B1 | 12/2001 | Bouchard et al. | 707/3 |
| 6,336,114 | B1 | 1/2002 | Garrison | 707/9 |
| 6,338,066 | B1 | 1/2002 | Martin et al. | 707/10 |
| 6,393,424 | B1 | 5/2002 | Hallman et al. | 707/10 |
| 6,460,141 | B1* | 10/2002 | Olden | 713/201 |
| 6,466,941 | B1 | 10/2002 | Rowe et al. | 707/102 |
| 7,254,831 | B2* | 8/2007 | Saunders et al. | 726/8 |
| 7,278,155 | B2* | 10/2007 | Hsieh et al. | 726/8 |
| 7,426,642 | B2* | 9/2008 | Aupperle et al. | 713/185 |
| 2001/0000045 | A1 | 3/2001 | Yu et al. | 707/9 |
| 2001/0011349 | A1 | 8/2001 | Garrison | 713/165 |
| 2001/0025342 | A1 | 9/2001 | Uchida | 713/186 |
| 2001/0036299 | A1 | 11/2001 | Senior | 382/124 |
| 2001/0037407 | A1* | 11/2001 | Dragulev et al. | 709/250 |
| 2001/0049687 | A1 | 12/2001 | Russell | 707/104 |
| 2002/0004839 | A1 | 1/2002 | Wine et al. | 709/231 |
| 2002/0010857 | A1 | 1/2002 | Karthik | 713/168 |
| 2002/0013785 | A1 | 1/2002 | Miyazaki et al. | 707/104 |
| 2002/0016853 | A1 | 2/2002 | Ressler | 709/236 |
| 2002/0016921 | A1 | 2/2002 | Olsen et al. | 713/200 |
| 2002/0024419 | A1 | 2/2002 | Dunn | 349/5.52 |
| 2002/0038426 | A1 | 3/2002 | Pettersson et al. | 713/186 |
| 2002/0042883 | A1* | 4/2002 | Roux et al. | 713/201 |
| 2002/0055912 | A1 | 5/2002 | Buck | 705/76 |
| 2002/0056043 | A1 | 5/2002 | Glass | 713/179 |
| 2002/0062452 | A1 | 5/2002 | Ford | 713/201 |
| 2002/0083192 | A1 | 6/2002 | Alisuag | 709/237 |
| 2002/0087869 | A1 | 7/2002 | Kim | 713/186 |
| 2002/0133504 | A1 | 9/2002 | Vlahos et al. | 707/104 |
| 2002/0161766 | A1 | 10/2002 | Lawson et al. | 707/9 |
| 2002/0174010 | A1* | 11/2002 | Rice, III | 705/14 |
| 2003/0005134 | A1 | 1/2003 | Martin et al. | 709/229 |
| 2003/0033535 | A1* | 2/2003 | Fisher et al. | 713/185 |
| 2003/0140120 | A1* | 7/2003 | Hartman | 709/219 |
| 2003/0154403 | A1* | 8/2003 | Keinsley et al. | 713/201 |
| 2003/0163737 | A1* | 8/2003 | Roskind | 713/201 |
| 2003/0182551 | A1* | 9/2003 | Frantz et al. | 713/170 |
| 2003/0200465 | A1* | 10/2003 | Bhat et al. | 713/202 |
| 2004/0158746 | A1* | 8/2004 | Hu et al. | 713/202 |

FOREIGN PATENT DOCUMENTS

WO    01/27723 A1    4/2001

OTHER PUBLICATIONS

International Search Report PCT/US 02/15466 dated Mar. 15, 2004.
Ankari Inc. Promotional Material, pp. 1-2, "Trinity Enterprise Authentication," (2001); pp. 3-4 "Trinity—The Heart of the Solution" downloaded from http://www.itsecuritymall.com/desc/trinity.htm.
Oracle Advanced Security Administrator's Guide Release 8.1.5 Chapter 7 "Configuring Identix Biometric Authentication", downloaded from http://wpi.wpi.edu/network.815/a67766/07_ident.htm.

* cited by examiner

SYSTEM AND METHOD FOR AUTOMATED LOGIN

FIELD OF INVENTION

The invention relates generally to controlling access to a computer system. More specifically, in one embodiment, the invention relates to systems and methods for using user profiles to authenticate the identify of a user of a computer system.

BACKGROUND

The number of computer applications used by large corporations has increased significantly over the past twenty years. For example, companies may employ separate applications for electronic mail, document control, financial applications, inventory management, manufacturing control and engineering functions, in addition to overall network access. Each application often requires a separate login procedure, including some form of personal identification such as a user ID, a password, a key sequence or biometric authentication. The increase in the number of applications requiring user authentication requires significant effort on part of the users of the applications to create, secure, and remember their authentication data. Furthermore, from a management perspective, the proliferation of computer applications with varying security and sign-on procedures adds significant cost to the ongoing maintenance of a secure information technology infrastructure.

The user faces similar login requirements when accessing server-based applications over the Web. For example, the user may face different login procedures (typically involving different passwords) to access bank accounts, brokerage accounts, subscription content sites, etc.

Indeed, the mere need for computer users to keep track of multiple logon names, passwords and PINs in order to access different information further increases the chances of unauthorized use and loss of private information. Users may resort to using the same logon name and password combinations for all accounts, rendering them equally vulnerable if unauthorized access to a single account is obtained. On the other hand, security-conscious users who maintain different logon names and passwords for individual accounts may, to avoid confusion, write them down where they may be found or store them on easily stolen devices such as personal digital assistants—thereby undermining their own efforts. Often those who routinely change their passwords but record them on paper or in a computer file are at greater risk of being compromised than those who use a single but difficult-to-crack password. At the very least, such security-conscious individuals risk forgetting their access information, necessitating time-consuming calls to customer-support lines. In some known systems, different applications may attempt to synchronize their login procedures and user credentials, but this is often limited to applications from particular suppliers and cannot be extended across varying technology platforms.

What is needed, therefore, is a method and system for facilitating the central management of user authentication, access, and usage that can easily accommodate the introduction of new computer applications into a large computing environment.

SUMMARY OF THE INVENTION

The present invention automates the login process by storing login indicia (such as passwords, biometric authentication information, and the like) and recognizing the login screens of server and/or web-based applications. In response to a user's selection of an application and consequent receipt of a login or other form-based screen, the invention fills in the information called for by the screen and causes its transmission back to the server. In this way, the user is not burdened by the login process, and need not maintain awareness of the different requirements of each login screen she may encounter. The functionality of implementing the login resides on the user's client computer. The user's profile—i.e., the authentication information as well as the characteristics of the login screens for which the user is registered—is stored on a single-sign-on server and subsequently provided to the client computer only after the user authenticates herself thereto.

Accordingly, in a first aspect, the invention comprises a method for controlling user access to computer applications. The method comprises storing user profile information on a server, and authenticating a user's identity to the server from a client machine. The server sends the stored user profile information to the client machine, and the client machine transmits data sent as part of the user profile to one or more applications, thereby granting the user access to the applications.

The user profile can include one or more passwords, user identification codes, or secure access codes for granting a user's access to one or more applications. The user profile can also include a set of user privileges that define a user's functional capabilities within a set of applications. Additionally, the user profile information can include biometric data. The biometric data can be captured at the client machine, sent to a server machine, and compared to a reference set of biometric data to confirm the identity of a user.

In one embodiment, the invention recognizes application screens as they are presented to a user, and in response to the screens, enters data into one or more fields that make up the screen, and sends the data to the application. Moreover, the invention can facilitate the revocation of a user's access to one or more applications, or require a user to reauthenticate their identity. The revocation or reauthentication can, for example, be initiated by one or more trigger events. The trigger events can be stored in the user profile, and can include a broken communications connection, the expiration of a password, a changed password, the passage of time, or a sequence of events at the client or in the application, or both. The user profile can remain on the client machine after the termination of a user session, or alternatively, can be erased upon termination of a user session.

In a second aspect, the invention comprises a system for controlling user access to one or more applications. The system has a server for storing user profile information relating to one or more applications. The system also includes a web server for transmitting the user profile to a client computer, and a client-resident agent for facilitating the receipt of the user profile information from the server.

In one embodiment, the user profile stored on the server can include one or more of a password, a user identification code, and a secure access code. The user profile can include a set of user privileges defining a user's access and functionality rights within one or more applications. In one embodiment, the system includes a biometric device attached to the client computer for capturing biometric data from a user, a communications module for transmitting the biometric data, and a server for receiving the biometric data and comparing it to a set of reference biometric to determine the identification of the user. The client-resident agent may be configured to recognize application-specific screens, to use information stored in the user profile to complete data entry fields on the screens, and to transmit the data to the application server for processing.

Other aspects and advantages of the invention will become apparent from the following drawings, detailed description, and claims, all of which illustrate the principles of the invention, by way of example only.

BRIEF DESCRIPTION OF THE DRAWINGS

The above and further advantages of the invention may be better understood by referring to the following description taken in conjunction with the accompanying drawings, in which.

DETAILED DESCRIPTION

Figure 1:
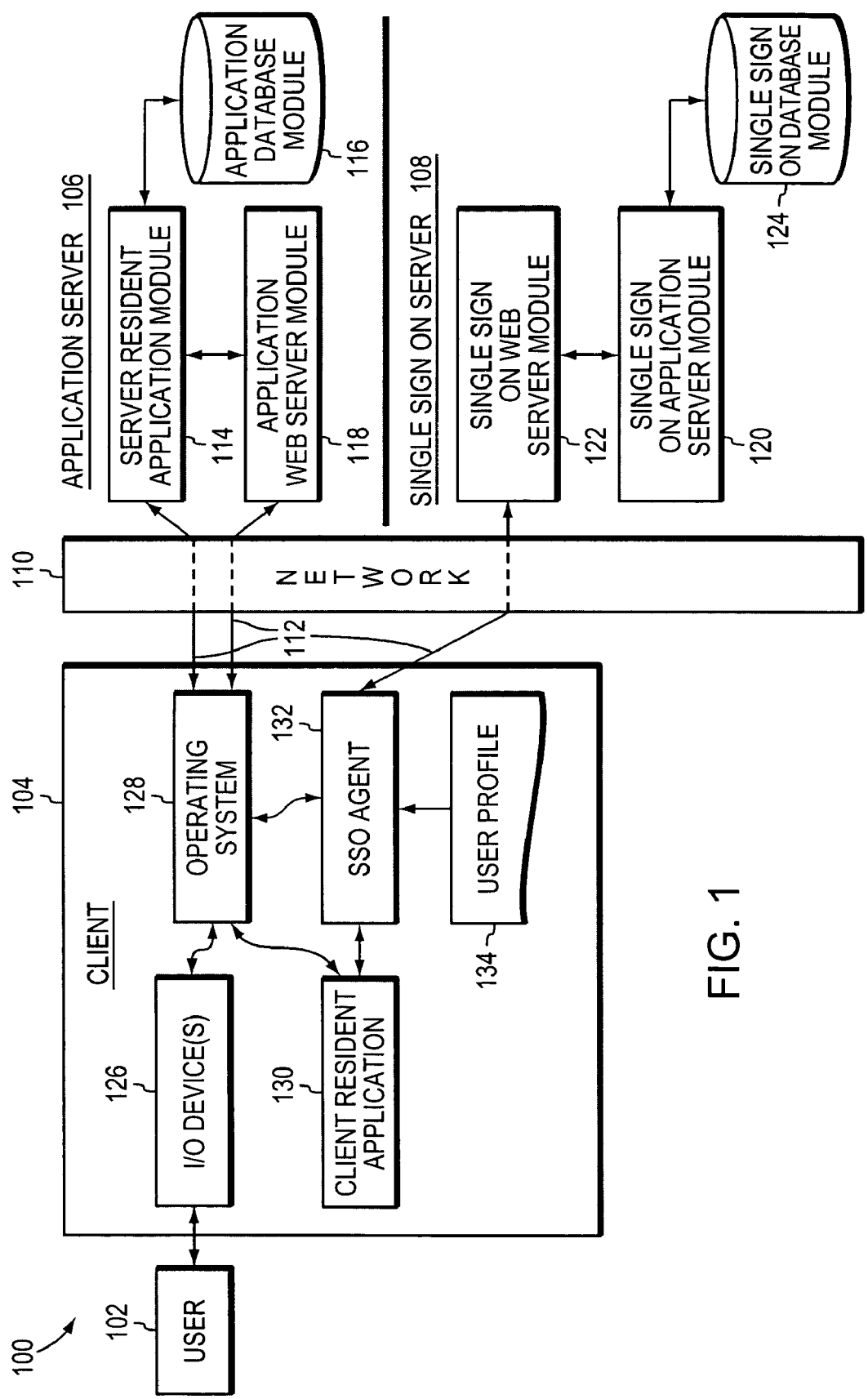
FIG. 1 is a block diagram of a system to authenticate a user and automate login to one or more applications using a client-resident user profile and a single-sign-on server in accordance with the invention.

In broad overview, FIG. 1 illustrates an embodiment of a system 100 to automate the login process to and to audit the user's activity within one or more applications in accordance with the invention. The system 100 includes a first computing system (a "client") 104, a second computing system (an "application server") 106 and a third computing system (a "single-sign-on server") 108, all in communication with a network 110. The client node 104 is used by one or more users, indicated graphically at 102. The client node 104, the application server 106 and the single-sign-on server 108 are in communication with the network 110 using communication channels 112.

For example, the communication channels 112 can connect the client 104 to a local-area network (LAN), such as a company Intranet, a wide area network (WAN) such as the Internet, or the like. The client 104 and servers 106, 108 communicate with the network 110 through the communication channels 112 using any of a variety of connections including, for example, standard telephone lines, LAN or WAN links (e.g., T1, T3, 56 kb, X.25), broadband connections (ISDN, Frame Relay, ATM), wireless connections, and the like. The connections can be established using a variety of communication protocols (e.g., HTTP(S), TCP/IP, SSL, IPX, SPX, NetBIOS, Ethernet, RS232, direct asynchronous connections, a proprietary protocol, and the like). In one embodiment, the client 104 and the servers 106, 108 encrypt all communication when communicating with each other.

Each of the servers 106, 108 can be any computing device capable of providing the services requested by the client 104. Particularly, this includes logging into secure applications, tracking user activities within applications, and terminating a user's access to applications as described in more detail below.

The application server 106 includes one or more server-resident application modules 114 and one or more application database modules 116. The application server 106 may also include an application web server module 118 to facilitate communication with the client 104 over the network 110 where the communication network 110 is the Internet, an intranet, or the like. The single-sign-on server 108 includes a single-sign-on application server module 120, a single-sign-on web server module 122, and a single-sign-on database module 124. The modules throughout the specification can be implemented in whole or in part as a software program and/or a hardware device (e.g., ASIC, FPGA, processor, memory, storage and the like).

For purposes of illustration, FIG. 1 depicts an application server 106 as an entity separate and distinct from the single-sign-on server 108 and each server in independent communication with the network 110. It is to be understood, however, that the servers 106, 108 can also be implemented, for example, on a single server (e.g., as logically distinct modules), distributed on portions of several (i.e., more than two) servers, and/or as part of a single server node or server farm in communication with the network 110 through, for example, a single web server (not shown). It should further be understood that even if two logical servers are running in the same physical machine, they may be secured logically if any of the following conditions are met: (1) the servers run in different process spaces (so there is no possibility for one process to access the memory of another process); (2) the servers access different logical databases (which may be further partitioned) with different credential or entry requirements; (3) sensitive data in the application server 106 and the single-sign-on server 108 are encrypted using separate encryption keys; or (4) the server applications are launched (e.g., in a Unix environment) under two different logon accounts. For heightened security, it is possible to encrypt all the data used by the single-sign-on server 108 using a key maintained by the application server 106 or an external key server. This approach enhances security because a breach of the of the single-sign-on server 108 and its database 124 would yield only encrypted data.

The client 104 can be any computing device (e.g., a personal computer, set top box, wireless mobile phone, handheld device, personal digital assistant, kiosk, etc) used to provide a user interface to access the application server 106. The client 104 includes one or more input/output devices 126 such as a keyboard, a mouse, a screen, a touch-pad, a biometric input device, and the like. The client 104 also includes an operating system 128. Operating systems supported by the client 104 can include any member of the WINDOWS family of operating systems from Microsoft Corporation. The client 104 may also include one or more client-resident applications 130, such as INTERNET EXPLORER developed by Microsoft Corporation, NETSCAPE NAVIGATOR developed by AOL Time Warner, or ATTACHMATE developed by Attachmate Corporation.

To use the system 100, a user 102 registers that user's authentication data for one or more applications with the application server 106. The authentication data can include, for example, a password, a user identification number, or biometric data associated with the individual's fingerprint(s), facial characteristics, voice, and the like. The system 100 stores authentication data identifying the user to the system (e.g., username, logon ID, employee ID, and the like) in the application database module 116. The application database module 116 may also associate an alias with that stored data. For example, employee #2054 may be associated with the alias 719jLL01. As the user logs into an application 114 (residing on the application server 106) via the network 110, a single-sign-on agent 132 residing on the client 104 captures the authentication data entered by the user 102 using one or more input devices 126 and transmits (or causes the transmission of) the authentication data to the single-sign-on web server module 122 residing on the single-sign-on server 108. The single-sign-on agent 132 captures the data by, for example, monitoring a messaging queue for instructions sent to and from the operating system, intercepting HTTP requests sent to and from the network 110, capturing screen images sent to the output device(s) 126, as well as other methods. The single-sign-on web server module 122 provides the authentication data to the application server module 120, which in turn stores the data in the database module 124. The single-sign-on application server module 120 then retrieves the updated authentication data and sends it to the client 104 using the web server module 122 and the single-sign-on agent 132. The authentication data is stored on the client 104 in the user profile 134 for future use by the single-sign-on agent 132 residing on the client 104. Thereafter, as the user logs into an application in the usual fashion, the single-sign-on agent 132 operates in the background, gathering and transmitting to the single-sign-on-server 108 all the information necessary to automate subsequent logins.

Alternatively, or in addition, the single-sign-on agent 132 may reside on a server. This embodiment is particularly useful in a "thin-client" environment, such as CITRIX METAFRAME. In this embodiment, a user 102 connects to a server where the single-sign-on agent 132 resides. This server, in turn, communicates with the application server 106 and identification server 108. The displayed output (such as HTML or screen dumps, for example) is obtained indirectly from the application server 106, by way of the server on which the single-sign-on agent 132 resides; that is, this additional server runs the single-sign-on agent 132 and passes back the display information (as pixel values, markup code, or any other suitable display modality) to the client 104.

The user profile 134 can contain various data furthering the function of the invention, such as: a user identification code; an authentication modality (such as password, biometric data, or the like); an application profile (such as a user's rights and privileges within an application); an application credential for access (such as a user's password, a digital representation of biometric data, or the like); and audit records of a user's activities within an application. The single-sign-on agent 132 can then use the data stored in the user profile 134 to determine which HTTP requests to intercept, to complete login screens with stored authentication data, and the like.

In the illustrated embodiment, there are security measures that the system 100 can use to ensure that a listening device does not capture this authentication data, or if the data is captured, that it is not usable by itself. For example, the single-sign-on agent 132 can encrypt the alias and the biometric data independently; the single-sign-on agent 132 and the single-sign-on database 124 can communicate with each other using SSL and/or public and private keys; and/or the single-sign-on agent 132 can transmit the alias and the authentication data independently to the single-sign-on database 124.

The registration process can be initiated in several different ways. The responsible technology administrator may initiate the registration. For example, the administrator can have the user come to the administrator's client 104 or a secure client 104 used only for registration when the employee starts work, when a customer purchases services accessible via the application server 106, and the like. Alternatively, the application server 106 can initiate registration when the user first requests a service from the application server 106 requiring user authentication. The client 104 can display a graphical user interface ("GUI") leading the user through the registration process. The level of authentication of the user at registration may be selected by the administrators of the system 100 and can range, for example, from a user presenting the correct password to the application server 106 to a user being present in person in front of an administrator who can check the identification of the user.

Once the system 100 registers an individual, the single-sign-on application server module 120 creates an association between the data identifying the user to the single-sign-on system and the user's alias in the application database 116, and another association between the user's alias and the user's authentication data in the single-sign-on database module 124. Storing the two associations at locations separate from each other requires a breach in security of both the application database 116 and the single-sign-on database 124 to put authentication data together with some identifying data. For example, the first association may be stored in the application database module 116 residing on one physical server, while the second association may be stored in the single-sign-on database module 124, residing on a second physical server. Further, if the identifying data is just another unique identifier that does not reveal identity by itself, for example an employee number, then the security of a third database (not shown) containing the association between the employee number and the identity (e.g., name and address of the employee) would have to be breached to match the identity of the user with that individual's biometric data.

Figure 2:
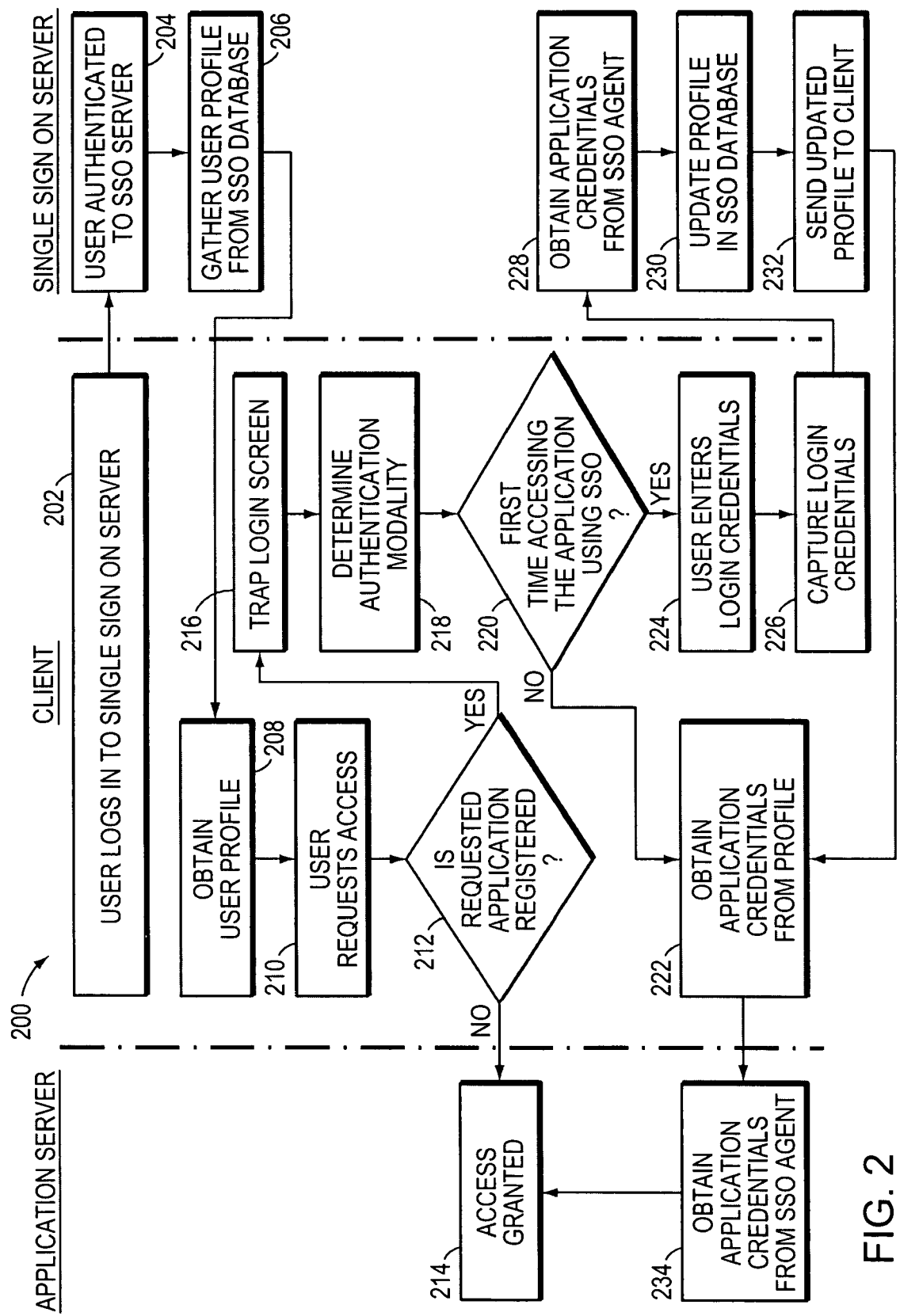
FIG. 2 is a flow diagram of a process to authenticate a user to one or more applications using a client-resident profile and a single-sign-on server in accordance with the invention.

With an individual registered in the single-sign-on server 108 (i.e., with user-identifying information, an alias, and authentication information obtained and stored in the single-sign-on database module 124), a process 200 as shown in FIG. 2 may be used to authenticate a user to one or more applications without the user having to provide authentication information for the application(s) each time the user requests access. The user 102 of the client 104 logs into the single-sign-on server 108 (step 202) by providing one or more of a password, user identification code, biometric data, or the like. The single-sign-on server 108 authenticates the user (step 204) and retrieves the user profile 134 associated with the user 102 from the single-sign-on database module 124 (step 206). The single-sign-on server 108 sends the user profile 134 to the client 104 (step 208) for future use by the single-sign-on agent 132.

In one version of the above-described embodiment, the user profile 134 remains on the client 104 after the user 102 terminates each session. In this case, the user profile 134 that is sent from the single-sign-on server 108 automatically overwrites the user profile 134 from the previous session. More preferably, however, the user profile 134 is deleted upon termination of each session for security purposes. In either case, once the update data arrives from the single-sign-on server 108 and is stored in the user profile 143 on the client 104, the single-sign-on agent 132 uses the data contained in the user profile 134 to automatically register the user 102 with the application 114 without the user needing to perform any authentication procedures.

The application server 106 provides access to a service (e.g., execution of an application program, access to a financial or medical database, access to an electronic vault with which the user is associated, download of data and/or application program and the like). As illustrated in the present embodiment, the user of an application requests access to the application by navigating to a login page or to an access screen for the application (step 210). The single-sign-on agent 132 recognizes the user action as a request to access an application and determines if the application is a restricted access application (decision step 212). If the single-sign-on agent 132 determines that, based on the data stored user profile 134 and described in detail above, the application is not restricted, access is granted (step 214).

Alternatively, if the single-sign-on agent 132 determines that the requested application is a restricted access application, the single-sign-on agent 132 traps the login or access screen (step 216). The login or access screen may be trapped by, for example, querying an operating system message queue, initiating random screen captures, attaching an object to an Internet browser to intercept HTTP messages, connecting to a terminal emulator using the HLLAPI protocol, and recognition of HTTP addresses, among other methods. In conjunction with trapping the login screen, the single-sign-on agent 132 queries the user profile 134 to determine the authentication modality used to gain access to the application (step 218). The single-sign-on agent 132 further determines whether the user 102 has previously accessed the application being requested (decision step 220). If in one instance, the user 102 has previously accessed the application being requested, the single-sign-on agent 132 obtains the application credentials (step 222) from the user profile 134, completes the login form or access screen, and transmits (step 234) the credentials to the application server 106. The application server 106 may then grant the user access to the application (step 214).

For example, in the case of a web application, the single-sign-on agent 132 may recognize, based on an entry in the user profile 134, an HTTP address entered by the user into the location field of a client-resident Internet browser application. If, for example, the resulting web page includes form fields requiring user authentication, the single-sign-on agent 132 queries the user profile 134 for the data records corresponding to that address, which include the data necessary to complete the form. Recognizing the data as corresponding to the requested web page, the single-sign-on agent 132 automatically completes the form and sends the data to the application server 106. Thus, the user gains access to the application without having to enter her authentication information and can perform the desired functions within the application.

Alternatively, for network-based applications accessed via application server 106, the single-sign-on agent 132 monitors the operating system message queue, recognizes messages corresponding to the requested application (based on entries in the user profile 134) and takes the appropriate action (also as specified entries in the user profile 134), e.g., logging the user in or, as described below, enforcing restrictions.

In another instance of the current example, a user 102 may be requesting access to an application for the first time. In such a case, the single-sign-on server 108 may not have the correct authentication credentials for the user 102, and therefore the single-sign-on agent 132 will not be able to complete the login screen. Therefore, the user 102 manually enters her authentication credentials (step 224) using one or more input devices 126. Using one or more of the methods described above, the single-sign-on agent 132 captures the authentication credentials (step 226), and if the login is successful, sends the information to the single-sign-on server 108. The single-sign-on server 108 receives the authentication credentials for the newly requested application (step 228), and sends them to the single-sign-on database module 124. The single-sign-on server 108 then updates the user profile (step 230) in the single-sign-on database module 124, and sends the updated user profile 134 back to the client 104. The single-sign-on agent 132 then obtains the application credentials (step 222) from the updated user profile 134, completes the login form or access screen, and transmits (step 234) the credentials to the application server 106. The application server 106 may then grant the user access to the application (step 214).

In some circumstances, the login process may not be successful. This may be due to the user 102 manually changing his application password, the password expiring, an administrator resetting the password, or other application specific event. In such cases, the single-sign-on agent 132 recognizes the screens or messages representing an unsuccessful login sent from the application server 106 to the client 104. The application 106 can then send screens to the client 104 instructing the user 102 to reset his password PIN, or other authentication data. The single-sign-on agent 132 captures the reset process, updates the user profile 134 with the new data, and sends the new password to the single-sign-on server 108 where it is stored in the database module 124. The single-sign-on server 108 can then send the user profile 134 back to the client 104 for use during the current and/or future sessions. In some versions, the single-sign-on agent 132 can also automatically generate a random password for the user 102 such that the user 102 is unaware of the password-reset process.

Figure 3:
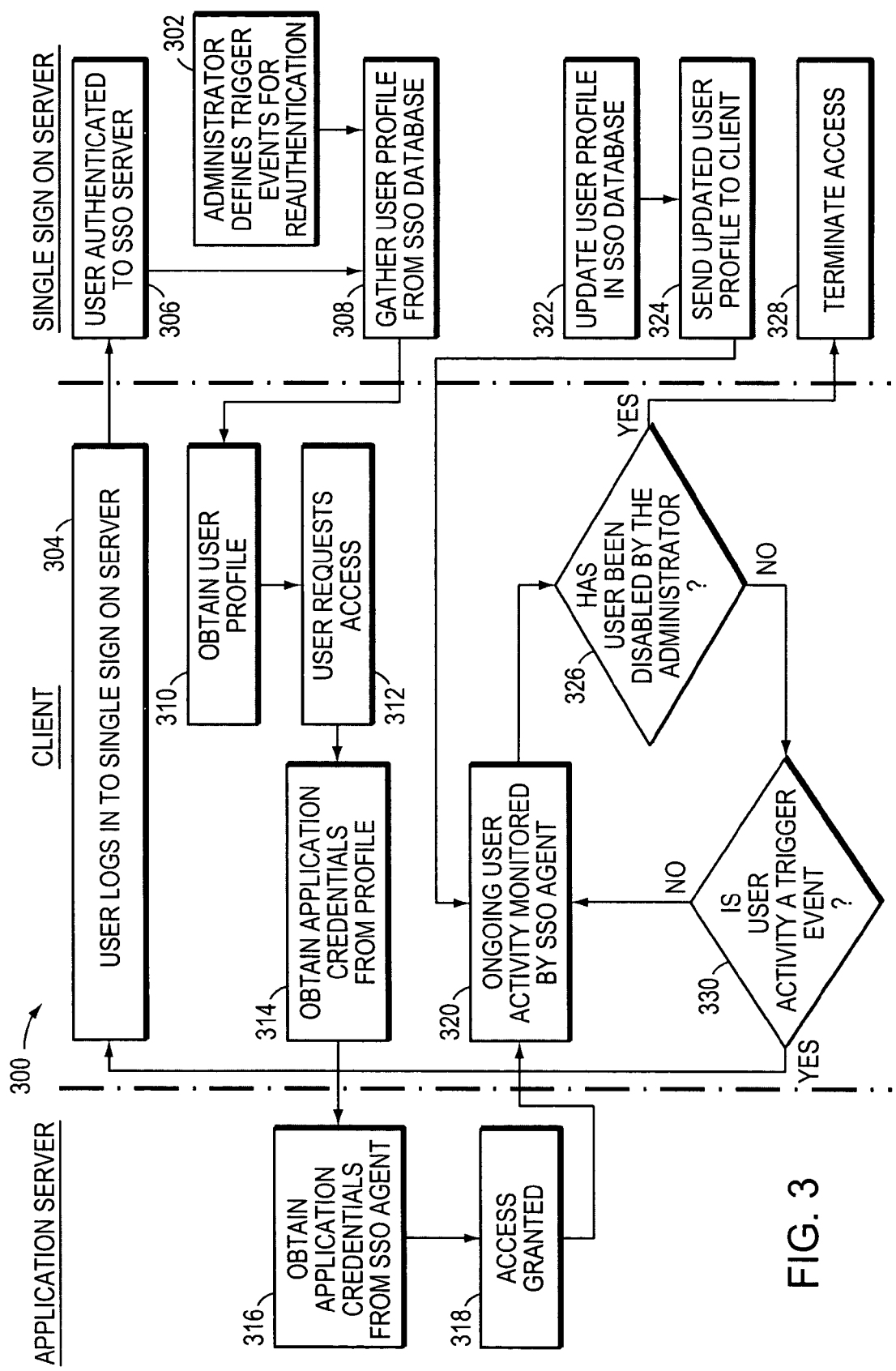
FIG. 3 is a flow diagram of a process to disable a user from one or more applications and define events that require a user to re-authenticate themselves using a client-resident profile and a single-sign-on server in accordance with the invention.

With an individual registered in the single-sign-on server 108 (i.e., with user-identifying information, an alias, and authentication information obtained and stored), a process 300 as shown in FIG. 3 may be used to automatically withdraw a user's access rights to an application and to define events that require a user to be re-authenticated. Prior to a user 102 being logged into the single-sign-on server 108, an administrator may define trigger events (step 302) which, when recognized by the single-sign-on agent 132, may terminate access, or require re-authentication, to the single-sign-on server 108. A trigger event can be a particular function or screen accessed by a user, a broken communications link, inactivity of the user, a signal from the server sent on a periodic or random basis, expiration of an application password, or the like. Furthermore, trigger events can be set globally for all users and all applications, for individual users across all registered applications, for particular applications, for certain modules within applications, or for entries in selected fields on particular screens. The trigger events can be stored in the single-sign-on database module 124 as part of a user profile 134. When a user 102 logs into the single-sign-on server 108 (step 304), his authentication credentials are authenticated (step 306) by the single-sign-on server 108. The single-sign-on server 108 queries the single-sign-on database module 124 and gathers the data necessary to construct the user profile (step 308). The single-sign-on agent 132 residing on the client obtains the user profile data from the single-sign-on server 108 and stores the user profile on the client 104 (step 310).

Continuing with the example above, a user 102 requests access (step 312) to an application server 106. The single-sign-on agent 132 retrieves the authentication credentials (step 314) from the user profile 134 residing on the client 104, and transmits the credentials to the application server 106. The application server 106 receives the application credentials (step 316) from the client 104, and grants the user 102 access to the requested application (step 318). Once granted access to the application server 106, the user 102 may execute functions (step 320) within the application based on the data stored in his user profile 134.

Data specifying these restrictions is stored in the user profile 134, and once again, the single-sign-on agent 132 constantly monitors the user's activities (by trapping screens, fields within a screen, etc.) and permits execution of only these actions consistent with the restrictions.

For example, a first user 102 may be restricted to view only particular screens within an application, may only have read access to data on particular screens, may only be able to update a single field on a screen, or may be blocked from viewing certain web pages within a permitted web site. Conversely, a second user (not shown) may have full administrative rights to an application, and/or may have rights to view any or all web pages within a particular web site. Therefore, the single-sign-on agent 132 may restrict the first user's actions based on the information in her user profile (preventing transmission of "save" commands in conjunction with read-only data or requests for disallowed web pages), while the second user may have no restrictions on the functions she may perform, or data she can enter and update based on the data in her user profile.

In one particular version, the invention permits an administrator to revoke a user's access to one or more applications 114 registered with the single-sign-on server 108, even in the case where the user 102 is currently logged into the application(s). Referring again to FIG. 3, the single-sign-on agent 132 may constantly monitor the ongoing user activity (step 320) for activities corresponding to entries in the user profile 134 currently residing on the client 104. An administrator may then update one or more user profiles 134 (step 322) with instructions that the user's access rights are to be revoked. The updated user profile may then be sent (step 324) to the client 104 for use by the single-sign-on agent 132 as it monitors ongoing user activity, overwriting the previous user profile 134. If the single-sign-on agent 132 receives notice the user's access rights have been revoked (decision step 326), the single-sign-on agent traps the user activity and terminates access (step 328) to the identified application(s) 106.

A user 102 may also be required to re-authenticate himself to the single-sign-on server 108 based on one or more trigger events. A re-authentication trigger event may be, for purposes of illustration, a particular function initiated by a user or an administrator, a broken communication link, a screen or web page requested by a user, inactivity of the user, passage of some period of time, revocation of access rights, the execution of a particular sequence of functions, elapsed time within an application, the receipt of web content, or a signal from the server sent on a periodic or random basis. The trigger events can be stored in the single server database module 124 as part of a user profile 134, and are sent to the client 104 when a user 102 logs into the single-sign-on server 108. As the user 102 performs ongoing activities within applications, the single-sign-on agent 132 can determine if the user's access privileges have been revoked (decision step 328). If a user's access privileges have not been revoked, the single-sign-on agent 132 can then determine if a re-authentication trigger event has occurred (decision step 330). If, in one case, no re-authentication trigger event has occurred, the user 102 may continue to use the application(s) 106 without interruption. If, however, a re-authentication trigger event has occurred, the user activity can be interrupted and the user may be presented with a login screen (step 304) for the single-sign-on server 108.

Figure 4:
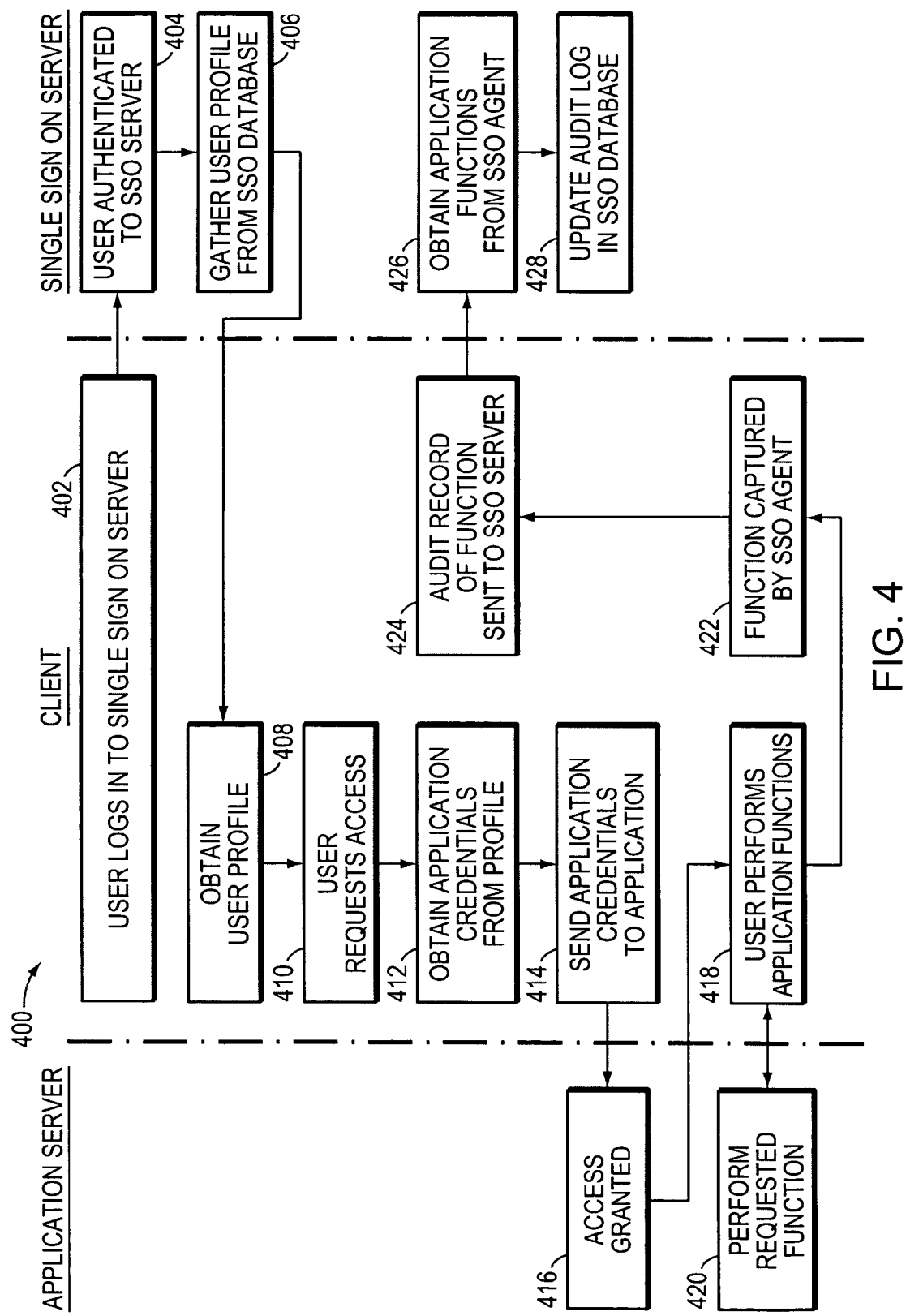
FIG. 4 is a flow diagram of a process to audit user activities within one or more applications using a client-resident profile and a single-sign-on server in accordance with the invention.

FIG. 4 illustrates yet another feature of the invention that facilitates the capturing of some or all of a user's activities (or particular specified activities) within one or more applications, and the recording of the activities in audit records, which may be stored on the single-sign-on server 108, in the user profile 134, or both. As discussed above, the user of an application requests access to the application by navigating to a login page for the single-sign-on server (step 402). The user is authenticated (step 404) to the single-sign-on server 108, the user profile 134 for that user is retrieved (step 406) from the single-sign-on database module 124, sent to the client 104, and obtained (step 408) by the single-sign-on agent 132. A user 102 may now request access (step 410) to one or more applications 106 via the single-sign-on server 108, according to the process described above and illustrated in FIG. 2.

As described above, the single-sign-on agent 132 obtains the application credentials (step 412) from the user profile 134, completes the login form or access screen, and transmits (step 414) the credentials to the application server 106. The application server 106 then grants the user 102 access to the application (step 416), and the user 102 may then perform various functions (step 418) within the applications which are completed (step 420) by the application server 106. During this process, the single-sign-on agent 132 can capture, on a continual, predefined, random or some other periodic basis, (step 422) data relating to the functions requested or performed by the user 102.

For example, the mere fact that the user has accessed the application and the time this occurred may represent an auditable event. Thus, as previously described, the single-sign-on agent 132 watches for user activities (again, as specified in the user profile 134) by monitoring message queues, HTTP requests, screens or the like, and the accessed application and the time of access may be stored as audit data in an audit log. For example, the data may initially be stored in the client 104 and periodically and/or concurrently sent to the single-sign-on server 108 for storage on the database 124.

Specific user transactions may also represent auditable events. Data specifying these events may be stored in the user profile 134 and organized as sublistings according to the applications to which they relate. For example, suppose the user accesses his brokerage account, checks his portfolio positions, and orders a trade. Perhaps successful login to the account and the trade execution represent auditable events, but the portfolio query, as no more than status check, may not be such an event. In this case, a sublisting of auditable events pertaining specifically to the brokerage account HTTP is stored in the user profile 134 along with data enabling the single-sign-on agent 132 to trap the appropriate data. For example, the user profile may specify data enabling recognition of the trading page, as well as the page fields corresponding to the desired audit data and an instruction to attach a time stamp to the data when it is transmitted. More generally, the single-sign-on agent 132 monitors the user's activity in accordance with the sublistings corresponding to the current application, and extracts the audit information specified therein. For example, as noted above, the single-sign-on agent 132 may send the captured data (step 424) to the single-sign-on server 108, which thereby obtains the records of the captured user activities (step 426), and may update the audit log (step 428) stored in the single-sign-on database module 124.

In this way, the need to store audit data on an application-by-application, server-by-server basis is eliminated. Instead, such data can be stored on a user basis across applications, and in whatever physical location is deemed appropriate. The data may later be sorted to track the user's individual activity, or to track the activities of all users of a given application.

In the embodiments of the invention described above, the software may be configured to run on any computer or workstation such as a PC or PC-compatible machine, an Apple Macintosh, a Sun workstation, etc. In general, any device can be used as long as it is able to perform all of the functions and capabilities described herein. The particular type of computer or workstation is not central to the invention.

The single-sign-on server 108 may include a network interface continuously connected to the network 110. In a typical implementation, the network interface and the other internal components of the single-sign-on server 108 intercommunicate over a main bi-directional bus. The main sequence of instructions effectuating the functions of the invention and facilitating interaction among clients 104, servers 106 and 108, and the network 110 can reside on a mass storage device (such as a hard disk or optical storage unit) as well as in a main system memory during operation. Execution of these instructions and effectuation of the functions of the invention is accomplished by a central-processing unit ("CPU").

A group of functional modules that control the operation of CPU and effectuate the operations of the invention as described above can be located in system memory. An operating system directs the execution of low-level, basic system functions such as memory allocation, file management, and operation of mass storage devices. At a higher level, a control block implemented as a series of stored instructions, responds to client-originated queries by selecting and/or assembling, and then transmitting, appropriate data.

EQUIVALENTS

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method of controlling access by a user operating a client computer to one or more server-based applications communicating with the client over a computer network, the method comprising the steps of:
   a. storing, on an identification server communicating with the client over a computer network, authentication information for the user in connection with a plurality of server-based applications;
   b. identifying the user;
   c. based on the user's identity, causing the identification server to automatically supply the authentication information to the client computer; and
   d. causing the client computer to (i) recognize data indicative of a screen displayed to the user as relating to one of the plurality of server-based applications, and in response to the recognized screen, and (ii) enter user profile information into at least one field and causing transmission of the entered information to the one of the plurality of server-based applications, thereby granting the user application.

2. The method of claim 1 wherein the authentication information includes at least one of a password, a user identification code, a secure access code, a set of user privileges and a set of trigger events.

3. The method of claim 2 wherein the authentication information includes a set of user privileges and further comprising the step of limiting the user's operation of the application in accordance with the user privileges.

4. The method of claim 1 wherein the authentication information comprises reference biometric data identifying the user, the user being identified according to steps comprising:
   a. receiving, at the client computer, biometric data from the user;
   b. transmitting the received biometric data from the client computer to the identification server over the network; and
   c. if the received biometric data sufficiently matches the reference biometric data, authenticating the identity of the user.

5. The method of claim 1 further comprising the step of causing the identification server to revoke the user's access to one or more applications.

6. The method of claim 5 wherein the user's access rights are revoked in response to one or more trigger events.

7. The method of claim 6 where a trigger event is any of a broken communication connection, the expiration of a password, a changed password, the passage of time, and a sequence of events.

8. The method of claim 6 further comprising the step of transmitting to the client, following the revocation, a request for the user to authenticate the user's identity to the identification server.

9. The method of claim 1 further comprising the step of erasing, on the client computer, the profile information upon termination of a user session.

10. A system for controlling access by a user operating a client computer to one or more server-based applications communicating with the client over a computer network, the system comprising:
    a. an identification server connected to a computer network for storing user authentication information in connection with a plurality of server-based applications and authenticating the user;
    b. a web server module for transmitting the user authentication information from the identification server to the client computer, and;
    c. a single-sign-on agent residing on the client computer for:
       (i) receiving the user authentication information;
       (ii) recognizing data indicative of a screen displayed to the user as relating to at least one of the plurality of server-based applications;
       (iii) automatically entering user profile information into at least one field on the recognized screen; and
       (iv) transmitting the entered user profile information to one or more server-based applications.

11. The system of claim 10 wherein the authentication information stored on the identification server includes at least one of a password, a user identification code, a secure access code, a set of user privileges and trigger events.

12. The system of claim 11 wherein the user authentication information includes user privileges and wherein the single-sign-on agent limits the user's operation of the application in accordance with the user privileges.

13. The system of claim 10 wherein the authentication information stored on the identification server comprises reference biometric data identifying the user, the system further comprising:
    a. a biometric input device for receiving, at the client computer, biometric data from the user;
    b. a communications module for transmitting the received biometric data from the client computer to the identification server over the network; and
    c. an authentication server for comparing the received biometric data to reference biometric data.

14. A system, operable on a user's client computer connected to a computer network, for controlling access by the user to one or more applications communicating with the client over a computer network, the system comprising:
    a. means for receiving, from an identification server communicating with the client over a computer network, authentication information for the user in connection with a plurality of server-based applications;

b. means for identifying the user;
c. means for causing the identification server to automatically supply the authentication information to the client computer based on the user's identity;
d. means for causing the client computer to recognize data indicative of a screen displayed to the user as relating to at least one of the plurality of server-based applications;
e. means for causing the client computer to automatically enter user profile information into at least one field on the recognized screen; and
f. means for causing the client computer to use the entered profile information to obtain access to the one or more applications.

15. The method of claim 1 wherein the authentication information comprises profile information.

16. The method of claim 1 wherein the recognized screen comprises a plurality of fields.

17. The method of claim 1 wherein the transmission of the entered profile information to the application is done in a manner dictated by instructions defining the screen.

18. The method of claim 1 wherein the user profile information is stored on the client computer.

19. The system of claim 10 wherein the authentication information comprises profile information.

20. The system of claim 10 wherein the recognized screen comprises a plurality of fields.

21. The system of claim 10 wherein single-sign-on agent transmits the entered profile information to the application is done in a manner dictated by instructions defining the screen.

22. The system of claim 1 wherein the user profile information is stored on the client computer.

* * * * *